United States Patent
Choi

(10) Patent No.: US 9,546,821 B2
(45) Date of Patent: Jan. 17, 2017

(54) SMALL NUCLEAR POWER GENERATOR

(71) Applicant: Il ho Choi, Wanju-gun (KR)

(72) Inventor: Il ho Choi, Wanju-gun (KR)

(*) Notice: Subject to any disclaimer, the term of this patent is extended or adjusted under 35 U.S.C. 154(b) by 0 days.

(21) Appl. No.: 15/017,896

(22) Filed: Feb. 8, 2016

(65) Prior Publication Data

US 2016/0231059 A1 Aug. 11, 2016

(30) Foreign Application Priority Data

Feb. 6, 2015 (KR) ........................ 10-2015-0018810

(51) Int. Cl.
| | |
|---|---|
| *F28B 9/00* | (2006.01) |
| *F01K 11/02* | (2006.01) |
| *G21D 5/12* | (2006.01) |
| *G21C 1/32* | (2006.01) |
| *G21C 13/08* | (2006.01) |
| *G21D 1/00* | (2006.01) |

(52) U.S. Cl.
CPC ............... *F28B 9/00* (2013.01); *F01K 11/02* (2013.01); *G21C 1/32* (2013.01); *G21C 13/08* (2013.01); *G21D 1/006* (2013.01); *G21D 5/12* (2013.01); *Y02E 30/40* (2013.01)

(58) Field of Classification Search
CPC .............. G21D 1/00; G21D 1/02; G21D 5/06; G21D 3/00; G21Y 2002/201; G21Y 2002/304; F28B 1/00; F28B 5/00; F28B 11/00
USPC .............. 60/644.1, 203.1, 662, 670; 376/463
See application file for complete search history.

(56) References Cited

U.S. PATENT DOCUMENTS

| 4,336,105 A | * | 6/1982 | Silvestri, Jr. | ............ F01K 3/262 376/317 |
| 2012/0031449 A1 | * | 2/2012 | Erbil | ...................... H01L 37/02 136/201 |
| 2012/0243651 A1 | * | 9/2012 | Malloy | .................. G21C 15/18 376/282 |

(Continued)

FOREIGN PATENT DOCUMENTS

| DE | 3721919 A | * | 1/1989 |
| JP | 2012137266 | | 7/2012 |

(Continued)

*Primary Examiner* — Thomas Denion
*Assistant Examiner* — Mickey France
(74) *Attorney, Agent, or Firm* — KORUS Patent, LLC; Seong Il Jeong

(57) ABSTRACT

Provided is a small nuclear power generator which restores steam to water by applying pressure to the inside of a condenser using a pressurizer disposed over the condenser without condensing steam using cooling water. The small nuclear power generator includes: a nuclear reactor generating high-temperature heat by nuclear fission of a nuclear fuel; a steam generator converting internal water into steam by the high-temperature heat generated in the nuclear reactor; a turbine/generator including a steam turbine rotated by steam generated in the steam generator and a generator connected to an axis of the steam turbine and together rotating to produce electricity; and a condenser restoring steam to water by applying pressure to steam discharged after rotating the steam turbine using two or more pressurizers, again supplying the water into the steam generator, and formed of a titanium (Ti) or an alloy thereof.

3 Claims, 3 Drawing Sheets

(56) References Cited

U.S. PATENT DOCUMENTS

| | | | |
|---|---|---|---|
| 2012/0263270 A1* | 10/2012 | Malloy | G21C 1/326 376/396 |
| 2012/0324911 A1* | 12/2012 | Shedd | F25B 25/00 62/62 |
| 2015/0117586 A1* | 4/2015 | Graham | G21C 15/182 376/283 |

FOREIGN PATENT DOCUMENTS

| | | |
|---|---|---|
| JP | 2014010113 | 1/2014 |
| KR | 20100077215 | 7/2010 |
| KR | 20130061436 | 6/2013 |
| KR | 20140103273 | 8/2014 |

* cited by examiner

SMALL NUCLEAR POWER GENERATOR

CROSS-REFERENCE TO RELATED APPLICATIONS

This U.S. non-provisional patent application claims priority under 35 U.S.C. §119 of Korean Patent Application No. 10-2015-0018810, filed on Feb. 6, 2015, the entire contents of which are hereby incorporated by reference.

BACKGROUND OF THE INVENTION

The present invention disclosed herein relates to a small nuclear power generator, and more particularly, to a small nuclear power generator which restores steam to water by applying pressure to the inside of a condenser using a pressurizer disposed over the condenser without condensing steam using cooling water.

One example of the base material of the nuclear power generation in the nuclear power plant is uranium (U).

The atomic weights of uranium are 235 and 238, among which the uranium 235 generates an immense amount of energy when the nuclear fission occurs.

This can be understood through the mass energy equivalence principle of Einstein, which explains that when uranium 235 is disintegrated, a bit of mass decreases and the energy corresponding to this diminished mass occurs.

Like this, when mass is changed into energy, a very large amount of energy can be obtained from a very small amount of matter.

Accordingly, when uranium 235 continues the nuclear fission, a very large amount of heat can be obtained, and steam can be produced from the heat and be used to produce electricity.

A power plant which produces electricity like this is called a nuclear power plant, and the nuclear power plant shows superior operation performance compared to a hydraulic power plant and a thermoelectric power plant so far in terms of the economic feasibility, safety and environmental preservation. Also, the nuclear power plant has been settled as an important power generation facility.

In the nuclear power plant, when an emergent leakage accident of radioactive substances which are generated during the nuclear fission process of the nuclear fission matters occurs, a big disaster may occur. Accordingly, the safety of the nuclear power plant is being treated as a top priority task.

For this reason, the main configuration such as a nuclear reactor is located inside a containment building, and water (hereinafter, referred to as 'first water') used as a cooling medium and water (hereinafter, referred to as 'second water') used as steam are separated and circulated through different paths, which will be described in more detail as follows with reference to FIG. 1.

FIG. 1 is a view illustrating a configuration of a typical nuclear power plant.

As shown in FIG. 1, a Pressurized Water Reactor (PWR) type of nuclear power plant installed in Korea is configured to include a nuclear reactor 2, a pressurizer 4, a steam generator 6, a turbine/generator 7, and a condenser 8. Among these, the nuclear reactor 2, the pressurizer 4, and steam generator 6 are located inside a containment building 1 for safety.

The nuclear reactor 2 heats the first water to high temperature using heat generated through nuclear fission of a nuclear fuel.

In this case, a control rod 3 of the nuclear reactor 2 may be formed of a material sufficiently absorb thermal neutrons, and controls the reaction of the nuclear fuel while being inserted into and withdrawn from a core of the nuclear reactor 1.

The pressurizer 4 maintains the high-pressure state such that the internal temperature of the nuclear reactor 2 in which the nuclear fission continues does not rise (the first water inside the nuclear reactor does not boil), and serves as a surge tank of a coolant (first water). Also, the pressurizer 4 provides an expansion and condensation space for the nuclear reactor coolant during the normal operation, and maintains a uniform pressure to restrain the pressure variation during the transient state.

The steam generator 6 generates steam by heat-exchanging the first water of high-temperature and high-pressure with the second water.

The turbine/generator 7 includes a turbine 7a rotated by steam generated in the steam generator 6 and a generator 7b connected to the axis of the turbine 7a. The axis of the generator 7b rotates together with the axis of the turbine 7a to produce electricity.

The condenser 8 restore steam discharged after producing electricity to the second water by cooling steam through heat-exchange with cooling water (sea water or river water), and sends the second water to the steam generator 6 again.

In regard to the flow of the first water and the second water, the first water passes the nuclear reactor 2 by a coolant pump 5, and passes the lower ends of the pressurizer 4 and the steam generator 6 while circulating clockwise.

Generally, water starts to boil at a temperature of about 100° C., and in order to prevent this, a high pressure is applied through the pressurizer 4. Thus, the first water is not changed into steam, and moves to the steam generator 6.

The first water of high-temperature and high-pressure introduced through the lower inlet of the steam generator 6 along a pipe is separated from the second water inside the steam generator 6, and converts the second water into steam by applying heat to the second water by heat-exchanging.

Thus, in the RWR nuclear power plant, the first water passing the nuclear reactor 2 and having radioactivity is separated from the second water of the steam generator 6, in spite of an accident, the first water having radioactivity can be confined in the containment building for safety.

Meanwhile, steam generated in the steam generator 6 moves to the turbine 7a along the pipe, and operates the generator 7b to produce electrical energy.

Thereafter, steam discharged out of the turbine 7a moves to the condenser 8, and steam inside the condenser 8 is changed into the second water again by a cooling pipe 11 in which cooling water introduced from the outside through a cooling water pump 9 flows. Thus, the second water is again supplied into the steam generator 6 by a main water supply pump 10 and is circulated.

In a related art, when the condenser 8 condenses steam, steam is condensed while passing the cooling pipe 11. Accordingly, a typical nuclear power plant needs a large amount of cooling water, and thus most nuclear power plants need to be installed near sear or river. That is, the installation place is limited, and when the control rod 3 of the nuclear reactor 2, the turbine 7a, and the cooling function fail simultaneously, a big disaster may occur unless measures are prepared.

PRIOR ART DOCUMENT

Patent Document (Patent Document 1) Korean Patent Application Publication No. 10-2014-0103273 (published on Aug. 26, 2014)

SUMMARY OF THE INVENTION

The present invention provides a small nuclear power generator which can be operated without cooling water, can be constructed regardless of a place such as a desert, and can be manufactured into a small nuclear engine, by applying pressure, for restoring steam to water, to the inside of a condenser using a pressurizer disposed over the condenser instead of cooling steam using cooling water.

The present invention also provides a small nuclear power generator which can minimize a heat loss and thus prevent a nuclear reactor from being heated to an ultra high temperature by surrounding the nuclear reactor with a steam generator, and can further improve the stability by disposing a plurality of turbines in one nuclear reactor.

Embodiments of the present invention provide small nuclear power generators including: a nuclear reactor generating high-temperature heat by nuclear fission of a nuclear fuel; a steam generator converting internal water into steam by the high-temperature heat generated in the nuclear reactor; a turbine/generator including a steam turbine rotated by steam generated in the steam generator and a generator connected to an axis of the steam turbine and together rotating to produce electricity; and a condenser restoring steam to water by applying pressure to steam discharged after rotating the steam turbine using two or more pressurizers, again supplying the water into the steam generator, and formed of a titanium (Ti) or an alloy thereof, wherein: the steam generator is configured to surround the steam generator; the steam turbine is provided in plurality, each of which is connected to one steam generator through a steam passage; and an opening/closing unit is provided on each outlet of the steam generator connected to the steam passage.

In some embodiments, the nuclear reactor, the steam generator, the steam turbine, the condenser, and the steam passage may include outer walls exposed to the outside and doubly manufactured into a first outer wall and a second outer wall which are spaced from each other by a certain gap, forming a vacuum layer between the first outer wall and the second outer wall.

In other embodiments, the condenser may increase the internal pressure of the sealed condenser by the pressurizer and then may allow steam to forcibly flow into the condenser to restore steam to water, or when a steam inflow part is located on an upper portion of the condenser and steam flows into the condenser, steam may be restored to water by apply pressure to the inside of the condenser by the pressurizer.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Figure 1:
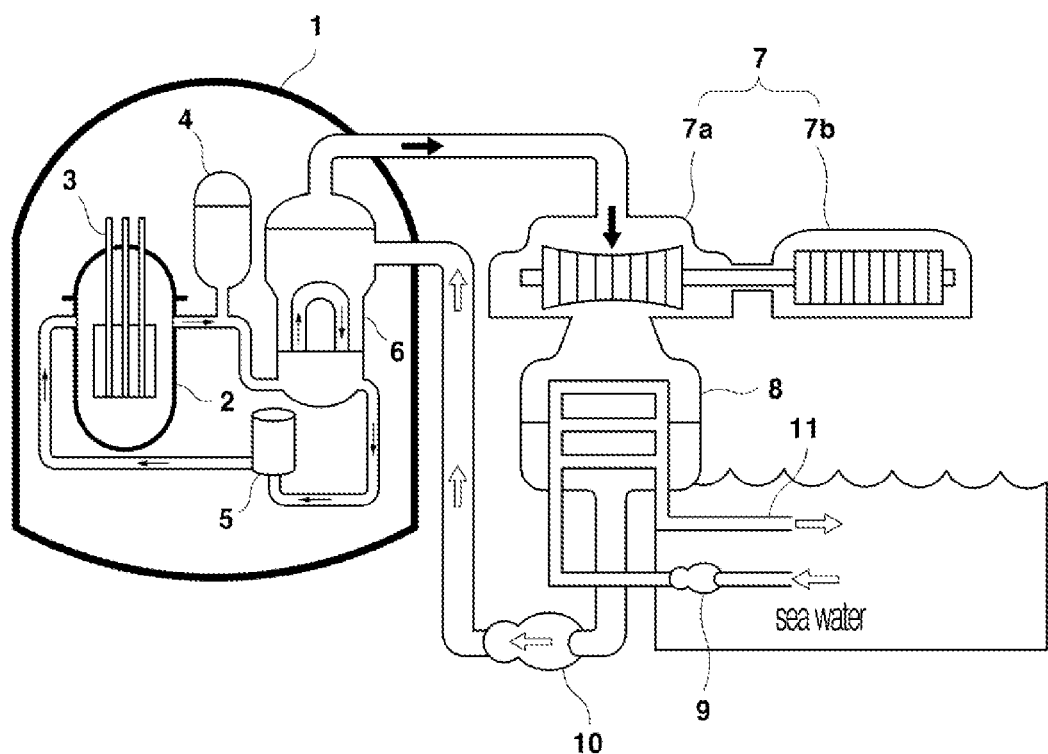
FIG. 1 is a view illustrating a configuration of a typical nuclear power plant.

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

Hereinafter, it will be described about an exemplary embodiment of the present invention in conjunction with the accompanying drawings.

In the accompanying drawings, it should be noted that the same components are indicated as the same reference numerals and symbols even if they are shown in different drawings.

Hereinafter, detailed descriptions related to well-known functions or configurations will be ruled out in order not to unnecessarily obscure subject matters of the present invention.

Furthermore, when it is described that one comprises (or includes or has) some elements, it should be understood that it may comprise (or include or has) only those elements, or it may comprise (or include or have) other elements as well as those elements if there is no specific limitation.

Figure 2:
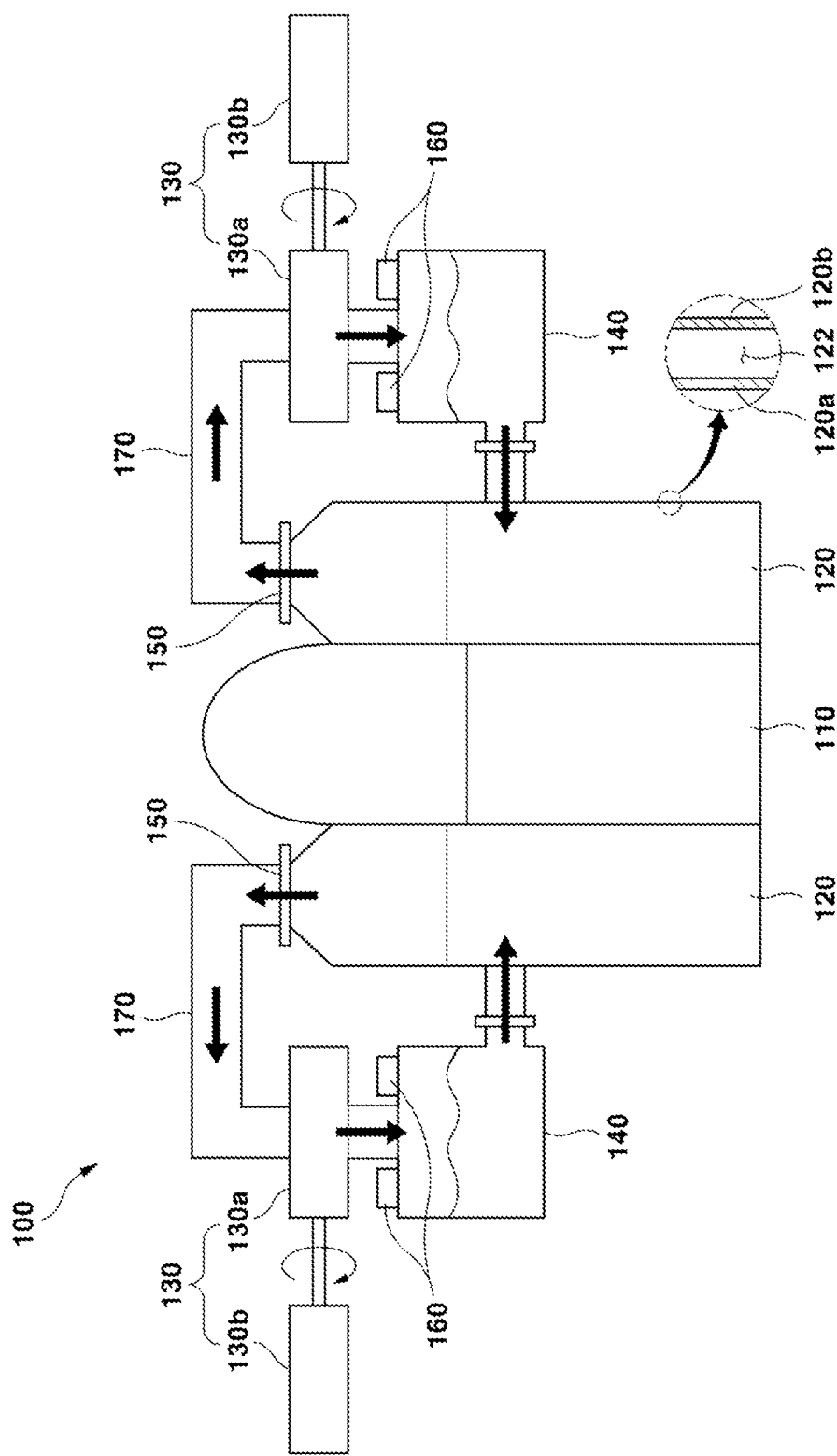
FIG. 2 is a side view illustrating a configuration of a small nuclear power generator according to an embodiment of the present invention.
Figure 3:
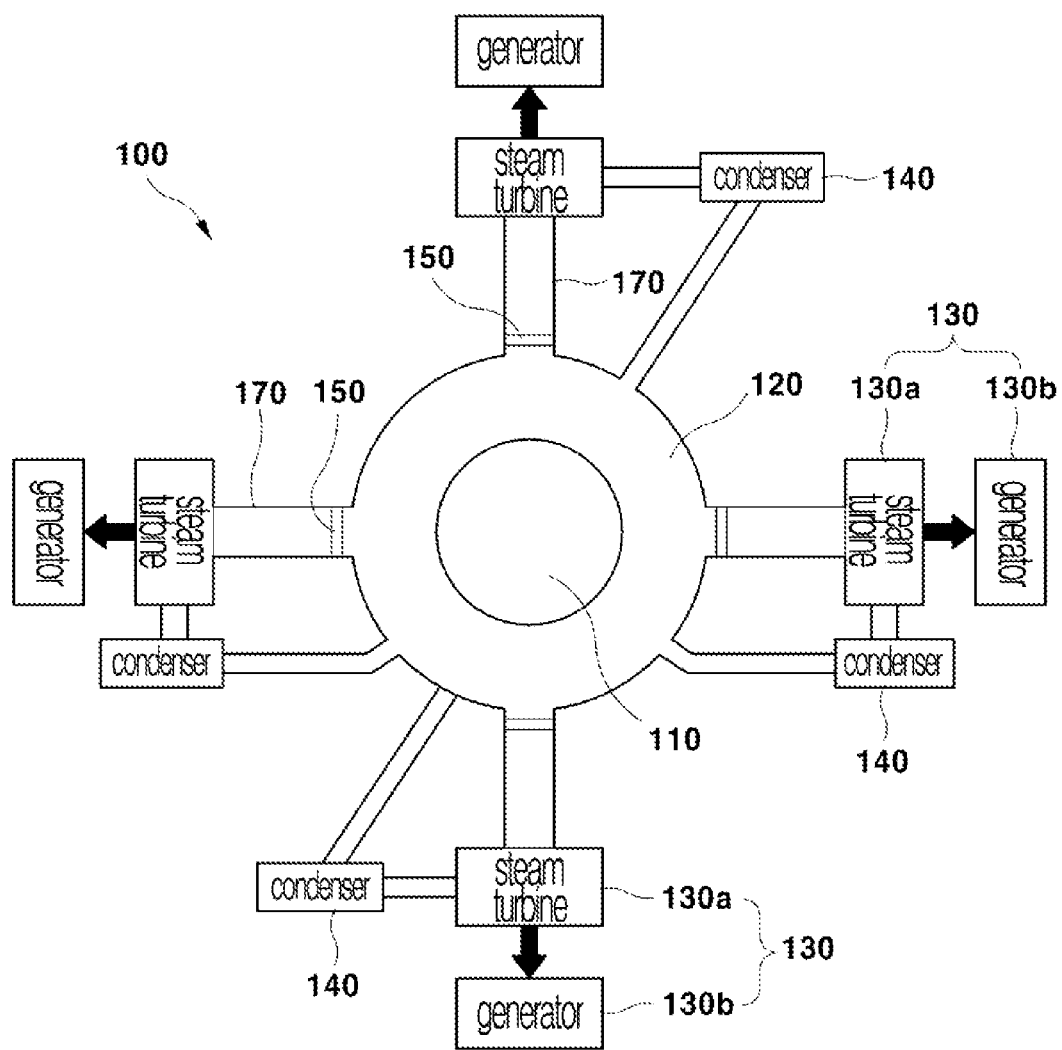
FIG. 3 is a view illustrating a concept of a small nuclear power generator according to an embodiment of the present invention.

FIG. 2 is a side view illustrating a configuration of a small nuclear power generator according to an embodiment of the present invention. FIG. 3 is a view illustrating a concept of a small nuclear power generator according to an embodiment of the present invention.

As shown in FIGS. 2 and 3, a small nuclear power generator may include a nuclear reactor 110, a steam generator 120, a turbine/generator 130, a condenser 140, and a pressurizer 160.

The nuclear reactor 110 may generate high-temperature heat by nuclear fission of a nuclear fuel such as uranium 235.

The steam generator 120 may be configured to surround the nuclear reactor 110, and may produce internal water into steam by high-temperature heat generated in the nuclear reactor 110 to sent steam to a steam turbine 130a of the turbine/generator 130.

The outer wall of the steam generator 120, as shown in the circular magnified view of FIG. 2, may be doubly formed to include a first outer wall 120a and a second outer wall 120 which are spaced from each other by a certain gap. A space 122 between the first outer wall 120a and the second outer wall 120b may be in a vacuum state, forming a vacuum layer and thus minimizing a heat loss to the outside.

The steam turbine 130a may be connected to the steam generator 120 through a steam passage 170, and may be rotated by steam generated in the steam generator 120. In this case, the axis of a generator 130b connected to the axis of a steam turbine 130a may rotate together to produce electricity in the generator 130b.

In this case, a connection part (outlet side of the steam generator) of the steam generator 120 and the steam passage 170 may be provided with an opening/closing unit 150 for interrupting steam upon failure or repair of the steam turbine 130a.

Also, the steam turbine 130a may be configured in plurality, and the axis of each of each steam turbine 130a may be connected to the axis of each generator 130b.

The reason why the steam turbine 130a is disposed in plurality is to prevent the nuclear reactor 110 from being overheated to a ultra high temperature, through normal operation of other steam turbines even though one steam turbine fails and thus to prepare for an accident or smooth power generation.

For example, when one of four steam turbines 130a fails, the failed steam turbine 130a may be stopped while the supply of steam to the failed steam turbine 130a is interrupted by the opening/closing unit 150 of the steam passage 170.

Also, when the power generation quantity is excessive, the nuclear power generation quantity may be controlled by control rods disposed in the nuclear reactor 110.

Steam discharged after rotating the steam turbine 130a may be supplied to the condenser 140.

The condenser 140 may include a plurality of pressurizers 160 disposed thereon, and the plurality of pressurizers 160 may increase the internal pressure of the condenser 140 to restore steam to water.

The pressurizer 160 may perform the same function as a typical pressurizer 4 of FIG. 1, and may restore steam to water by maintaining a high internal pressure of the condenser 140.

For example, assume that steam discharged after rotating the steam turbine 130a is about 250° C. at about 100 atmospheres. In this case, when the internal pressure of the condenser 140 becomes about 200 atmospheres by applying pressure to the condenser 140 using the pressurizer 160, steam may be restored to water of about 250° C. (when the natural temperature descent according to the lapse of time is ignored)

There may be two methods of restoring steam to water by supplying steam from the steam turbine 130a to the condenser 140.

First, the internal pressure of the condenser 140 that is sealed is increased by the pressurizer 160, and then steam may be forcibly introduced into the condenser 140 to be restored to water.

Second, when a steam inflow part is located at the upper end of the condenser 140 and steam flows into the condenser 140, the condenser 140 may be pressurized by the pressurizer 160 to restore steam to water.

The second method may be used when steam is not blocked from flowing into the condenser 140 upon pressurization.

Thus, water restored by the condenser 140 may be again supplied to the steam generator 120 to be circulated.

In this case, the small nuclear power generator 100 may further include a thermometer (not shown) disposed at the outlet of the condenser 140 for discharging water to the steam generator 120 and measuring the internal temperature of the condenser 140, and a vibration reducing member (not shown) for reducing vibration which is generated by the rotation of the turbine/generator 130 and is delivered to the thermometer. Thus, the breakage of the thermometer due to high vibration can be prevented.

Also, the condenser 140 may be formed of titanium (Ti) or an alloy thereof which has light weight and high corrosion resistance due to chemical stability of a TiO2 oxide film formed on the surface of the condenser 140.

The condenser 140 provided with the pressurizer 160 thereon may also be applied to a thermoelectric power plant.

The outer walls of the nuclear reactor 110, the steam turbine 130, the condenser 140, and the steam passage 170 which are exposed to the outside may be doubly formed like the outer wall of the steam generator 120, thereby forming a vacuum layer between walls and thus reducing a heat loss.

The small nuclear power generator 100 may be installed at a depth of more than 100 meters below ground, and only electricity produced in the turbine/generator 130 may be transmitted to the ground, thereby preventing radiation leaks.

Thus, when steam is restored to water of more than 200° C. by applying pressure to the inside of the condenser 140 and then water is again supplied into the steam generator 120, the thermal energy conservation efficiency may become higher than water is cooled to about 60° C. by sea water (cooling water) in a related art. Also, since separate cooling water is not needed, it is possible to construct a small nuclear power generator, which can be constructed even in a desert instead of seashore.

In other words, water of more than 200° C. may be supplied into the steam generator 120 through pressurization, and thus steam can be generated in the steam generator 120 using smaller thermal energy than water is cooled to 60° C. and is supplied into the steam generator 120 in a related art.

Also, when such pressurization condensing principle is applied, it is possible to manufacture a miniaturized nuclear engine.

According to an embodiment of the present invention, a small nuclear power generator can be operated without cooling water, can be constructed regardless of a place such as a desert, and can be manufactured into a small nuclear engine, by applying pressure, for restoring steam to water, to the inside of a condenser using a pressurizer disposed over the condenser instead of cooling steam using cooling water.

Also, the small nuclear power generator can minimize a heat loss and thus prevent a nuclear reactor from being heated to an ultra high temperature by surrounding the nuclear reactor with a steam generator, and can further improve the stability by disposing a plurality of turbines in one nuclear reactor.

The above-disclosed subject matter is to be considered illustrative and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A small nuclear power generator comprising:
   a nuclear reactor generating high-temperature heat by nuclear fission of a nuclear fuel;
   a steam generator converting internal water into steam by the high-temperature heat generated in the nuclear reactor;
   a plurality of turbine-generator units, each turbine-generator unit comprising a steam turbine rotated by steam generated in the steam generator and a generator connected to an axis of the steam turbine and together rotating to produce electricity; and
   a plurality of condensers provided respectively for the plurality of turbine-generator units, each condenser configured to restore steam to water by applying pressure to steam discharged from the steam turbine using a plurality of pressurizers, and supplying the water into the steam generator, the each condenser being formed of titanium (Ti) or an alloy, wherein:

the steam generator is configured to surround the nuclear reactor;

the steam turbine of the each turbine-generator unit is connected to the steam generator through a steam passage; and an opening/closing unit is provided on each outlet of the steam generator connected to the steam passage.

2. The small nuclear power generator of claim 1, wherein the nuclear reactor, the steam generator, the steam turbine of the each turbine-generator unit, the each condenser, and the steam passage comprise outer walls exposed to the outside and doubly manufactured into a first outer wall and a second outer wall which are spaced from each other by a certain gap, forming a vacuum layer between the first outer wall and the second outer wall.

3. The small nuclear power generator of claim 1, wherein the pressurizers increase the internal pressure of the each condenser and then the each condenser allows steam to forcibly flow thereinto to restore steam to water, or when a steam inflow part is located on an upper portion of the each condenser and steam flows into the each condenser, steam is restored to water by applying pressure to the inside of the each condenser by the pressurizers.

* * * * *